United States Patent [19]

Martin

[11] 3,875,272
[45] Apr. 1, 1975

[54] HOLLOW PELLETS AND METHOD OF MAKING SAME
[75] Inventor: Robert M. Martin, Golden, Colo.
[73] Assignee: Coors Porcelain Company, Golden, Colo.
[22] Filed: Nov. 26, 1973
[21] Appl. No.: 419,018

Related U.S. Application Data
[63] Continuation-in-part of Ser. No. 383,628, July 30, 1973.

[52] U.S. Cl............................ 264/43, 264/7, 264/13, 264/41
[51] Int. Cl............................................. B29h 7/20
[58] Field of Search ................... 264/41, 43, 7, 13; 260/DIG. 6

Primary Examiner—Lewis T. Jacobs
Attorney, Agent, or Firm—Reising, Ethington & Perry

[57] ABSTRACT

In accordance with the invention, high strength hollow pellets are manufactured by first forming hollow pellets the shell of each of which comprises particulate material, and thereafter providing the shell with at least an outer portion of increased density. The preferred embodiments include the step of dropping drops of liquid into a bed of powder of the material of which it is desired to make the pellets and preferably also a binder. When the drops of liquid fall into the powder, the powder immediately forms a spherical shell around each drop so as to form the hollow pellets upon vaporization of the liquid. It is preferred that the powder additionally contain some sodium bicarbonate or the like and that the liquid be an aqeuous acid solution such that, upon initial formation of the spherical shell of powder, the acid reacts with the sodium bicarbonate to generate carbon dioxide which causes the spherical shell to expand while yet additional powder coalesces onto the shell. After the pellets are thus formed, the density of at least the outer portions thereof is increased, this by compaction, by applying to the pellets an outer layer of powder which is of smaller particle size than that used for the bed, or by a combination of adding such an additional layer plus compaction. The method is particularly useful for the manufacture of high strength ceramic pellets, there being a firing operation on the pellets after they are formed as aforesaid so as to sinter the ceramic to monolithic structure.

15 Claims, 11 Drawing Figures

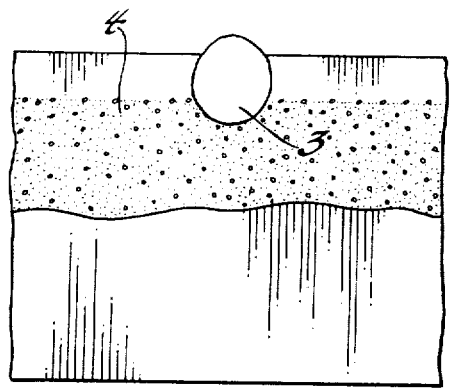
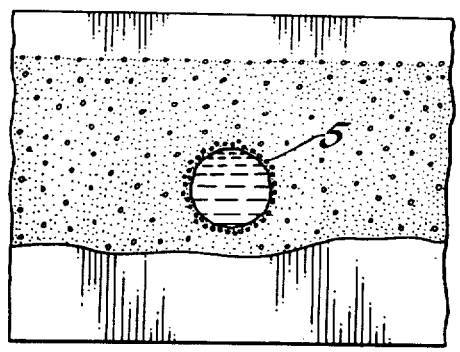
Fig. 1A    Fig. 1B
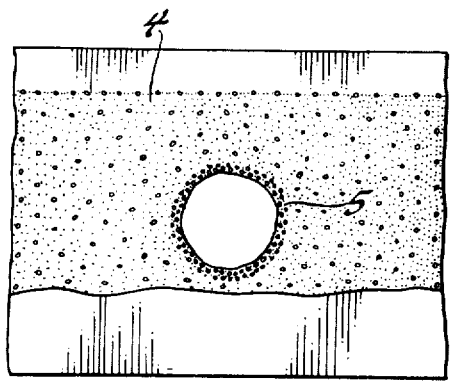
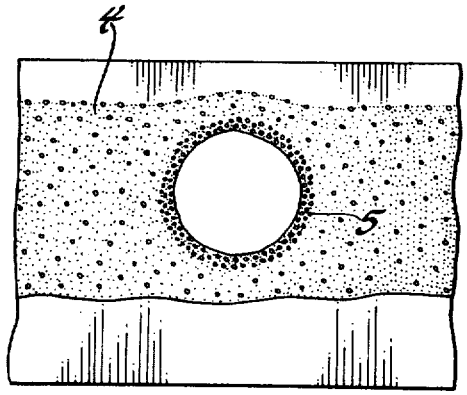
Fig. 1C    Fig. 1D
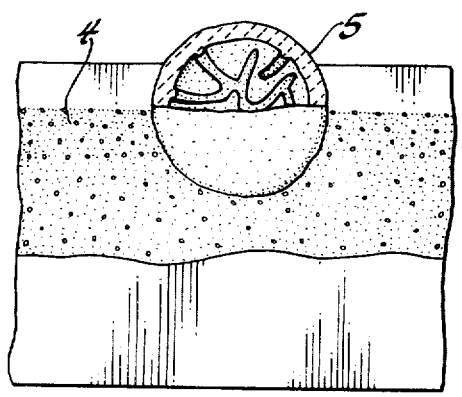
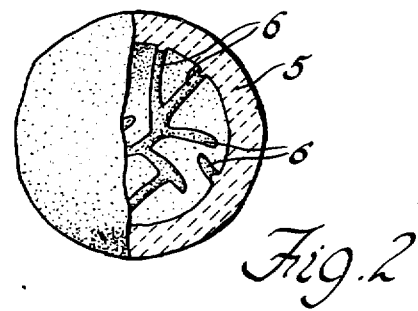
Fig. 1E
Fig. 2
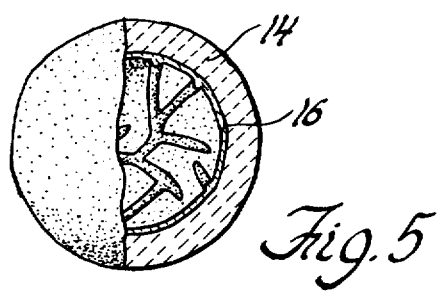
Fig. 5

HOLLOW PELLETS AND METHOD OF MAKING SAME

This application is a continuation-in-part of U.S. Pat. Application Ser. No. 383,628 filed July 30, 1973.

The subject matter of the present invention is a method for manufacturing small hollow pellets, and the pellet structure resulting from the practice of the method. The invention has particular utility for manufacturing small hollow pellets of sinterable material, especially ceramic, and will be described principally in connection therewith.

The need for the invention of the present application and that covered by the aforesaid U.S. Application Ser. No. 383,628 arose by reason of the invention disclosed and covered in U.S. Pat. Application Ser. No. 383,634 on CATALYTIC DEVICE AND CATALYTIC BODIES FOR USE THEREIN, filed concurrently with U.S. Application Ser. No. 383,628, in the name of Michael J. Fenerty and assigned to the assignee of the instant invention. In said Application Ser. No. 383,634 there is described and claimed a catalytic converter for automotive vehicle engine exhaust emissions wherein the gas permeable catalytic bed through which the exhaust emissions are passed consists of small hollow ceramic bodies coated or impregnated with a material, such as platinum which catalyzes the oxidation of unburned hydrocarbons and carbon monoxide. The use of hollow, as distinguished from solid, ceramic bodies as the substrate for the catalyst substantially increased the heat-up rate of the bed upon engine start-up and reduces the rate at which the abutting bodies abrade catalyst from the surfaces of each other due to vibration and road shock — all of this because of the substantial reduction in the weight of the bodies by reason of their being hollow. Hence, the need arose for a simple and efficient large scale method for manufacturing the small hollow ceramic bodies. The present invention fulfills this need. Further, the hollow ceramic pellets resulting from the practice of the present invention have a unique structure which provides increased mechanical strength to the pellets. The method now having been invented, various other and diverse uses for the small hollow pellets have arisen as will be described hereinafter.

Hence, it will be seen that it is a principal object of the present invention to provide an efficient, low-cost method of manufacturing small hollow pellets, and especially small hollow pellets of sinterable material, notably ceramic. A further object of the invention is to provide small hollow pellets, especially of sinterable material and notably ceramic, having structure which increases the strength of the pellets against crushing.

Other objects, features and advantages of the invention will appear more clearly from the following detailed description thereof made in part with reference to the accompanying drawing in which FIG. 1 shows, in lettered steps, the manner in which the hollow pellets are formed in accordance with a preferred embodiment of the invention;

FIG. 2 is a cross-sectional view, in greatly enlarged scale, of a hollow ceramic pellet made in accordance with the invention;

FIG. 5 shows a cross-sectional view, in greatly enlarged scale, of a composite hollow pellet made in accordance with the invention.

Figure 3A:
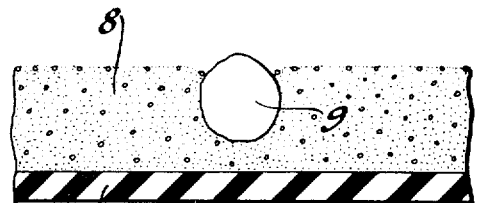
FIG. 3 shows schematically another preferred method for manufacturing the hollow pellets in accordance with the invention.

Briefly, the method of the present invention comprises the step of dropping into a bed of powder, drops of a liquid, the powder comprising the material of which it is desired to form the pellets and preferably also a binder for the powder which is soluble in the liquid and, additionally, a material which in combination with the liquid forms a gas. In operation, when the drop of liquid enters into the powder bed, the powder coalesces to and forms a shell around the liquid drop thereby resulting in formation of the hollow pellets upon absorption of the liquid into and vaporization of the liquid through and from the porous shell. Where gas is generated, as is preferred, the gas bloats or expands the shell as it continues to form prior to complete vaporization of the liquid. Where the hollow spherical pellets are of ceramic or other sinterable material, they are subsequently fired to sintering temperature to provide a strong unitary structure.

The invention will now be described in much greater detail particularly with reference to preferred embodiments thereof and for the manufacture of ceramic pellets.

In one preferred embodiment the bed is a fluidized bed and the powder put into the fluidized bed is a spray-dried mixture of the material of which it is desired to form the pellets, here ceramic, an organic binder, for example dextrine, which is soluble in the liquid drops, and a carbonate such as sodium bicarbonate; and the liquid drops are of an aqueous solution of an acid such as acetic acid. The following example will illustrate, the ceramic ingredients being aluminum oxide and clay (i.e., kaolin and ball clay).

A batch was prepared as follows:

| | |
|---|---|
| 3455 grams | aluminum oxide |
| 3455 grams | kaolin |
| 3080 grams | ball clay |
| 500 grams | sodium bicarbonate |
| 500 grams | dextrine |
| 12000 grams | water |
| 30 grams | silicone anti-foam agent (optional) |

This batch was placed in a ball mill and milled for 2 hours. The resulting slip was then spray-dried thereby to form fine generally spherical particles each containing the ceramic ingredients and the sodium bicarbonate bonded by the dextrine. Spray drying is the technique, well-known and widely known in ceramic art, wherein an aqueous ceramic slip, which may or may not also contain a binder for the ceramic, is sprayed into a tower while heated air is caused to circulate through the tower. This rapidly evaporates the water from the small droplets of the slip thereby resulting in spray dried powder which accumulates at the bottom of the tower. The spray dried powder has a Tyler mesh size of about 325 mesh.

The spray dried powder is then formed into a fluidized bed by placing it in an open-topped container having a perforated floor from which air is pumped upwardly through the powder thereby to maintain the powder in a state of suspension in the circulating air. The air circulated through the bed is heated to about 210°F and hence the fluidized bed is maintained at about this temperature. Into this bed is dropped, through size 20G needles and at a rate of about 4 drops per second per needle, a 2.5 percent by weight aqueous solution of acetic acid. In a very short time there commence to appear at the top surface of the fluidized bed small spheres formed of the powdered material and floating on the fluidized powder bed. What occurs in the fluidized bed to form the hollow pellets is shown, in enlarged scale, in FIG. 1. In FIG. 1, A shows a drop, 3, of acetic acid solution upon its entrance into the fluidized powder 4. B shows the powder commencing to coalesce around the drop to form the generally spherical shell 5, the water of the acetic acid solution dissolving the binder thereby to enhance the coalescence of the powder. C shows the bloating or expanding effect, on the shell, of the reaction of the acetic acid with the sodium bicarbonate in the powder coalesced around the drop while at the same time the shell 5 continues to thicken and the water of the acetic acid solution is absorbed and blown by the gas further into the powder shell to dissolve the binder therein and thereby enhance the continued coalescence. D indicates evaporation of water which lightens the pellet such that it moves upwardly toward the top of the fluidized bed. E shows the hollow pellet, now completely formed and with substantially all of the water evaporated through and from the porous dextrine-bonded coalesced powder shell, floating on the top of the fluidized bed and ready for removal from the bed.

As the small hollow spherical pellets continue to form, which can be at a very rapid rate by way of the use of a large number of needles, they can be easily skimmed off the top of the bed by a continuous or repetitive skimming operation. The small spheres, particularly by reason of the inclusion of the dextrine binder, have ample strength to be self-sustaining through the subsequent handling operations.

Next, the hollow spheres are placed on refractory trays and fired in a kiln up to a temperature of about 1,670°C. During the early stages of this firing operation the dextrine binder is burned out and subsequently during the firing operation the alumina reacts with the clay (i.e., the kaolin and the ball clay) to form mullite thereby resulting in hollow substantially spherical pellets of mullite having an O.D. of from about 0.132 inches to 0.175 inches, a bulk density of about 25 pounds per cubic foot, and a wall thickness of about 0.01 inches.

One of the pellets is shown, in greatly enlarged scale, in FIG. 2. The mullite shell 5 is impervious to water at ordinary atmospheric pressure but has sufficient porosity to be permeable by water under pressure. This is sufficient porosity to provide sufficient gas permeability to enable the pellets to "breathe" sufficiently to assure against rupture from rapid heating, and pressure differentials between the inside and the outside of the pellets.

The inner surface of the shell has randomly oriented webs as shown at 6. This webbed inner wall structure provides added mechanical strength to the pellets to better assure against crushing under compressive loading. The webs function much in the nature of the arches conventionally used in architectural dome structures.

It will be manifest that the pellets can be formed of any of numerous other ceramics, substantially without limit. Examples of other ceramics, in addition to mullite, particularly adapted for use of the pellets for automotive vehicle catalytic converters are alumina ceramic, cordierite, and beta spodumine. Other examples of ceramics from which the pellets can be formed are porcelain, zirconia, zircon, beryllia ceramic, silicon carbide and the other carbides such as tungsten carbide, glass, silica, boron nitride and the silicides such as monybdenum disilicide. It will be understood, of course, that the firing temperature and schedule used in the firing operation will depend on the particular ceramic being used, as well-known in the ceramic art. Also, it will be understood that the term "sinter," as used herein is used in the broad sense of meaning a reaction, or insipient fusion, or vitrification, during a firing operation whereby there is formed a monolithic or unitary structure of the final composition desired and of greatly increased strength as compared with the coalesced powder shell structure.

Sintered metal spheres can also be manufactured by the method, and the list of metals which can be used is limited only to the list of metals which, in powder form, can be sintered as is well-known in sintered powder metal art. Examples are copper, iron, nickel, cobalt, bronze, steel and any of an almost limitless list of metal alloys. Of course where the hollow pellets are relatively heavy either because of the material of which they are made or because of the shell thickness, they will sink rather than float on the fluidized bed after they are formed. In such case it is simply a matter of removing them from the bottom of the bed rather than from the top.

Whereas the high temperature firing operation is an essential step for the manufacture of monolithic ceramic pellets and for the manufacture of unitary sintered metal pellets, it is not an essential step to the method in its broadest scope. For example, where the powder material is a powdered organic resin, either self-adherent or including a binder thereby to form organic resin hollow pellets, the heating of the fluidized bed itself may be sufficient to cause the organic resin powder to bond together. It will be understood, of course, that in all cases the powder material from which the hollow pellets are made must be such that it is not soluble in the liquid drops which are dropped into the powder.

The spray drying operation for making the powder which is used in the bed is highly desirable but not essential. It is highly desirable because, where more than one ingredient is needed or desired in the powder bed, spray drying best assures complete uniformity of powder composition. Even in those embodiments of the invention, as hereinafter described, wherein sodium bicarbonate or the like is not used in the powder bed, it is, nevertheless desirable to use spray drying where a temporary binder such as dextrine is required, this in order to assure uniformity of composition between the binder and the ceramic metal or other powder.

The use of a fluidized powder bed, i.e., a bed wherein the powder is suspended in air or other gas, is excellent for the practice of the invention, particularly where the powder is no finer than 400 mesh. However, it is often desirable to practice the invention without the use of a fluidized powder bed. For example, if the powder is placed in a container the floor of which is caused to vibrate, there is imparted fluffiness to the powder such that the droplets enter into the powder to thereby be surrounded by it thereby to result in the formation of the hollow pellets. It is preferred, however, that the volume of the powder in the gas (generally and preferably air) in the powder-gas suspension be at least about 300 cc of the powder per liter of the suspension. As will be seen from the disclosure hereinafter, however, in another preferred embodiment of the invention the powder bed used is not a fluidized bed nor a bed wherein, by vibration or otherwise, the powder is in a suspended or moving state.

As regards the attainment of the hollow centers for the pellets, the best combination is to use a carbonate such as sodium bicarbonate or ammonium bicarbonate in the powder bed and to use as the liquid dropped into the bed a dilute aqueous solution of an acid such as acetic acid, hydrochloric acid, or one of the other mineral acids. However other combinations can be used to generate the gas. For example, benzoic acid or oxalic acid which are solids, can be used as an ingredient in the powder and the liquid used can be an aqueous alkaline solution such as a solution of sodium bicarbonate, ammonium bicarbonate or sodium or ammonium hydroxide. It will be understood, of course, that if residue from the materials used to generate the gas is deliterous to the final end product, then the materials selected to generate the gas should be such as not to leave any residue, examples being the aforementioned ammonium compounds and organic acids. If ammonium bicarbonate is used in the powder material, the powder should be maintained, both in preparation and in use, at a temperature not in excess of about 100°F.

Still further, it is within the purview of the invention, in its broadest scope, to utilize just the liquid itself as the agent for providing hollow centers to the pellets. That is, by maintaining the fluidized bed temperature approximately at or somewhat above the boiling point of the liquid drops dropped into the bed, the liquid itself can be caused to act as a blowing agent to assure the hollow centers to the pellets. As examples, just water can be used, with a bed temperature of about, or somewhat above, 212°F; or an organic liquid, or a solution of an organic liquid and water (for example, acetone and water) can be used, with a bed temperature of the liquid. Of course if the bed temperature is significantly lower than as aforesaid, the time required for vaporization of the liquid lengthens to the point where there is inefficiency, though not inoperability. On the other hand if the bed temperature is significantly greater than the boiling point of the liquid, vaporization of the liquid can be so rapid as to rupture the pellets or preclude their formation. The use of just water, or an organic liquid either alone or in combination with water, adds to expense not just in process time requirement, but also, in the case where organic liquids are used, in the added costs of the organic liquids and in the equipment required to prevent escape of their vapors into the atmosphere. It is on the basis of these considerations that the preferred method involves a combination of ingredients, one in the liquid and the other in the powder, which generates a non-toxic gas. preferably carbon dioxide, to expand the pellet shell.

It is much preferred that the binder used be soluble in the liquid drops. Where water or an aqueous solution is used as the liquid, dextrine is excellent as a binder. Another water soluble binder is polyvinyl alcohol. Where the liquid consists of or contains an organic solvent, then the choice of binder material soluble in the liquid is even broader in that it would include most of the organic resins and waxes, for example polyethylene, polyvinyl chloride, paraffin wax, etc.

Though it is preferred to include the soluble binder in the powder, it is within the purview of the invention to include the binder in the liquid. For example, in the embodiment described above wherein dextrine is used as the binder, the dextrine can, if desired, be dissolved in the aqueous acetic acid solution. In operation, as the solution is absorbed into the powder which coalesces around the drops of solution, the dextrine is thereby caused to penetrate into the coalesced powder thereby to function as a binder for the powder shells.

The size of the pellets can be controlled by the size of the drops dropped into the powder bed, the size of the drops, in turn, being controlled by the size of the needles or other dropping means used to form the drops. The size of the pellets, and also the thickness of the shells thereof, can also be controlled by the temperature of the bed and by the amount of gas producing reactants used. That is, higher powder bed temperatures, which cause vaporization of the liquid, and higher concentrations of gas-producing reactants cause larger pellets.

Where the pellets, i.e., the shells of the pellets, have the feature of sufficient porosity to allow the passage therethrough of liquid under pressure, the entire pellets can be impregnated with other materials. The following procedure, referenced to use of the bodies as catalyst carriers, illustrates.

An aqueous solution of a salt of the desired catalyst, for example a chloride or other salt of platinum, palladium, nickel, cobalt, copper, rhodium, etc., is placed in a container on which a partial vacuum can be drawn. The hollow ceramic bodies are then put into the solution. A partial vacuum (for example, about 25 inches mercury) is then applied to the container thereby withdrawing the air from the ceramic bodies. Then the vacuum is slowly released and the aqueous solution of the metal salt is drawn into the hollow bodies by reason of the partial vacuum in the hollow centers of the bodies. Thereafter the impregnated ceramic bodies can be dried and then fired in air or in a reducing atmosphere as desired, to convert the metal used as the catalyst to its elemental state. If the metal is one which easily oxidizes, then the firing should be in a reducing atmosphere if the metal rather than its oxide is desired.

Using a like procedure the bodies can be completely filled (i.e., both the hollow centers and the pores of the shells) with other liquids which can be subsequently caused to become solids — for example organic resins or metals.

Figure 3B:
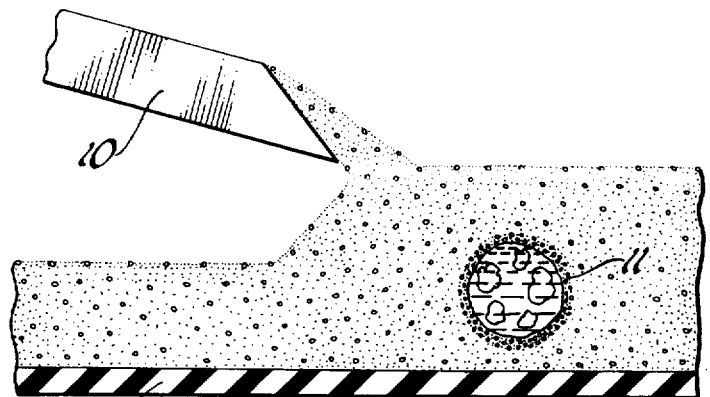
Figure 3C:
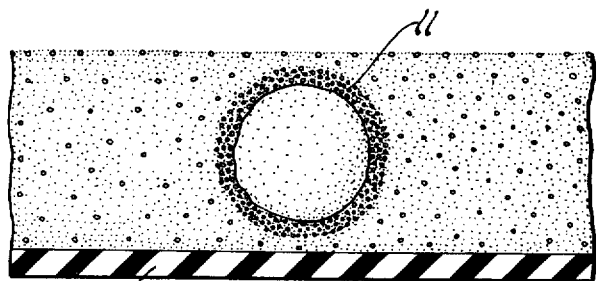

In the embodiments of the invention thus far described, the powder material in the bed is maintained in a state of suspension in air, either by way of the use of a fluidized bed of the powder or by way of a vibrating container for the bed which causes the powder to be in a state of motion. This allows the drops of liquid to enter into and below the surface of the bed such that the drops are completely surrounded by the powder. FIG. 3 schematically shows another preferred manner of practicing the invention, the various steps for the formation of the hollow pellets being depicted by the reference letters A, B and C.

Referring to FIG. 3, the reference numeral 7 is the top reach of a continuous conveyor belt which might be, say, 2 feet in width and with the top reach being, say, 20 feet long, the continuous conveyor belt being driven by suitably spaced rolls about which the continuous conveyor belt extends. The arrow indicates the direction in which the conveyor belt moves. On the conveyor belt is a layer 8 of the powder material from which the hollow pellets are to be made. The layer of powder has a level upper surface and is of relatively uniform thickness. This is easily accomplished by dumping the powder material onto the belt and then using a doctor blade to provide uniform thickness and the relatively smooth level upper surface to the powder layer. In essence, then, what we have is a translating relatively smooth surfaced powder layer. Onto the upper surface of this translating powder layer are dropped the drops of the liquid. The aforesaid teachings with respect to the composition of the powder and the composition of the liquid are applicable to this embodiment. Hence, the powder preferably consists of a spray dried mixture of the material of which it is desired to make the pellets, sodium bicarbonate or the like and dextrine or other water soluble organic binder; and the liquid preferably consists of an aqueous solution of an acid such as acetic acid. The powder should preferably be sufficiently fluffy that the drops of liquid sink down into the powder at least to the extent that more than one-half, i.e., the lower half, of each drop is below the upper level of the powder bed. At A there is shown in much enlarged scale, one of the drops of liquid, 9, just after it is dropped onto the translating powder bed.

Next, additional of the powder material, the same in composition as that of the powder bed, is dropped onto the translating bed so as to cover the upper portion of the drops thereby to surround the drops with the powder material. This is shown at B, the reference numeral 10 schematically indicating means, such as a sloped chute, positioned above the powder layer and immediately downstream from where the drops of liquid are dropped onto the powder layer, for dropping the additional powder material onto and over the drops of liquid. At step B, there is also depicted the outset of the coalescence of the powder material onto the drops of liquid to form the shell 11. Step C shows the expansion of the powder shell 11 by reason of the reaction of the acid in the liquid with the sodium bicarbonate or the like in the powder. The translating bed can be exposed to heat lamps commencing immediately downstream from the point where the additional powder is dropped onto the bed so as to regulate the temperature of the bed to cause the evaporation of the liquid. After the hollow pellets are formed on the translating bed, it is then only a matter of removing the hollow pellets from the powder material, and this can be easily accomplished by screening the powder such that the hollow pellets are removed therefrom. The remaining powder on the belt can then be recirculated. Of course, the hollow pellets removed from the bed can then be further processed, as by a firing operation, all as described earlier.

Figure 4:
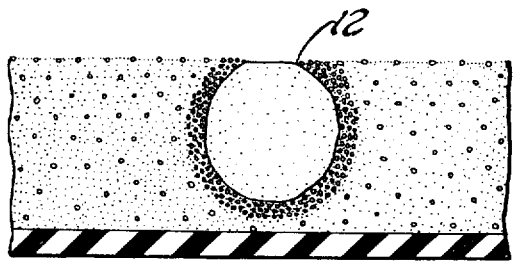
FIG. 4 shows schematically a variation of the method shown in FIG. 3.

Using a variation of the embodiment just described in conjunction with FIG. 3, the pellets can, if desired, be manufactured such that they have an opening at one side thereof. This can be accomplished either by the elimination of the step of dropping additional powder material over the tops of the drops or by only dropping so much additional powder material over the drops as to not completely cover the drops with the additional powder material. That is, when the additional powder material deposited over the drops of liquid is not so much as to completely surround the drops with the powder, the expansion of the pellets by way of a generation of gas results in the formation of an opening at the top of each pellet as it lies on the bed. This is shown in FIG. 4 which is a view the same as that shown in Step C of FIG. 3 except that the hollow pellet of FIG. 4 has an opening 12 because of the lack of sufficient powder to completely surround the drop of liquid dropped onto the bed. Of course this embodiment is useful if it is desired to have pellets with communication, or increased communication, between the exterior and the hollow interior thereof.

As indicated earlier, the hollow pellets made in accordance with the invention have utility as a catalyst support. However, there are many other uses for the pellets, examples of which are as follows: fillers for insulating refractory brick and other articles, low heat capacity radiant lumen supports; low-weight corrosion resistant balls for flow meters; floating balls to conserve heat or prevent evaporation from molten metal baths or plating baths; low inertia balls for use in certain types of hydraulic valve lifters; light weight filler for castings.

The fluidized bed embodiment of the invention, as described in conjunction with FIG. 1, is generally most desirable where the powder used, be it prepared by spray drying or otherwise, has a Tyler mesh size of greater than about 400 mesh, i.e., where the powder is such that substantially none of it will pass through a 400 mesh screen. Where the mesh size of the powder is substantially smaller than this, it is generally preferred to use the embodiment of the invention as described in conjunction with FIG. 3. The reason for this is that where fine powder, i.e., powder of a size less than about 400 mesh, is used in the fluidized bed embodiment of the invention, there can be need for keen adjustment of the air flow upwardly through the fluidized bed to assure against the fine particles being blown out of the fluidized bed and also to assure against the formation of air channels through the fluidized bed.

Irrespective of where the FIG. 1 embodiment or the FIG. 3 embodiment is used, it is preferable that the powder for the bed be prepared by spray drying. This is because spray drying not only assures excellent uniformity of composition, as previously mentioned, but also because spray drying results in particles or grains which are of generally spherical shape and of relatively uniform size. These characteristics of the grains or particles impart to the powder a high degree of fluffiness and flowability to the end that even in the FIG. 3 embodiment of the invention, the drops of liquid dropped onto the bed sink well into the powder and retain their identity as generally spherical liquid drops — this because the fluffiness and flowability of the powder is such as to offer only minimal resistance to penetration into the bed by the drops.

Though it will generally be desirable that the pellets, particularly where used as catalyst carriers, have sufficient porosity to enable impregnation as described above, it will be understood that the pellets can be made non-porous — as by the use of higher firing temperatures or longer firing schedules, or both, for the manufacture of ceramic pellets, as well known in the ceramics art.

The attainment of greater shell density generally is most important where there is requirement for the pellets to have still increased abrasion resistance and increased crush strength, i.e., the ability to withstand crushing from heavy compaction loads. In addition to the adjustment of firing temperature or schedule the degree of porosity, and hence the density can be controlled by choice of the grain size of the powder used for the bed from which the pellets are made. The smaller the grain size of the bed material, the less the porosity and the greater the abrasion resistance and the strength of the pellets to withstand crushing. But still another, and a preferred, method step for attaining increased shell density is to compact the shell prior to firing. This can be accomplished in a preferred manner by removing the pellets from the powder bed prior to all of the water (or other liquid used for the drops) being removed from the pellets, and then rolling a mass of the pellets against a surface and with the pellets being in continuous or frequent periodic contact with each other. The contact of the pellets with the surface on which they are rolled, and the contact of the pellets with each other causes a compaction of at least the outer surface of the shells of the pellets with the end result that, after firing, there is increased shell density and hence still further increased abrasion resistance and crush strength. Such rolling of the pellets can be simply accomplished by placing them on a rotating flat disc, there being sufficient of the pellets on a disc to cause continuous or frequent contact between the pellets. Alternatively, the pellets can be placed on a driven continuous belt, or caused to pass through a rotating follow cylinder, so that the pellets are caused to rotate against the surface of the belt or cylinder and against each other, thereby to cause the compaction.

Another, and even more preferred, method for increasing the density and therefore the crush strength of the pellets is to apply to the outer surface of the pellets, prior to firing, additional ceramic, or other material of which the pellets are formed, and preferably also containing organic binder, but with this additional material in no case requiring any sodium bicarbonate or other "blowing agent" and with the additional material being of a smaller grain size than that of the particulate material used as the bed for the initial formation of the pellets. This can be accomplished in a preferred manner by using the pellet rolling technique, be it on a rotating disc or moving belt or through a rotating cylinder, as aforesaid, but with the moving surface against which the pellets are rolled being supplied with additional ceramic, or other material of which the pellets are formed, plus an organic binder, and with this additional material being in a very fine state of subdivision, i.e., of a grain size less than that of the bed in which the pellets are initially formed. As the pellets roll against the finely divided material, they pick up a layer of this finely divided material on their outer surfaces while at the same time undergoing some compaction. When the pellets resulting from such an operation are fired, the result is a shell having increased density at the outer surface thereof thereby providing increased abrasion resistance and crush strength. If the additional finely divided material includes a binder it is preferred that such binder be soluble in the same solvent as that for the binder used in the powder bed for the initial forming of the pellets, and it should preferably be the same binder as that used in the bed.

Where it is desired to have some controlled porosity even in the more dense outer portion of the shell, it is preferred that the additional material supplied to the exterior surfaces of the shell be prepared by spray drying. However, and as indicated above, the spray dried material used as the additional material applied to the surfaces of the shells, as aforesaid, should be of a smaller grain size than that of the material used to initially form the pellets and need contain no sodium bicarbonate or other blowing agent. (The presence of sodium bicarbonate or other "blowing agent" in the additional material applied is unnecessary and innocuous, as regards its function as a gas-former, at this stage in the processing of the pellets; however, it does no harm.) The preparation of such spray dried material presents no problem since, as is well known in the art, the grain size of the agglomerates resulting from a spray drying operation can be closely controlled by the size of the drops of slurry sprayed into the spray drying tower. Hence, it is a simple matter to prepare, say, 200 mesh spray dried material, for use as the bed in the initial formation of the pellets, and then prepare finer spray dried material, of the same composition for use as the material applied, as aforesaid, to the exterior surfaces of the pellets after they are formed. It will be understood, of course, that the ceramic or other material used in the formulation of the slurry to manufacture the spray dried material is milled, prior to the forming of the slurry, to a particle size much less, generally by at least about an order of magnitude, than the grain size of the spray dried material desired to be formed. For example, whether the spray dried material is to be formed to a grain size of 325 mesh, or 400 mesh, or finer, the milling operation of the ceramic ingredients (in the case where it is desired to make the pellets of ceramic) for the formation of the slurry can be such as to reduce the particle size of the ceramic ingredients to less than about 5 microns, and ranging to submicron particle size.

Other methods can, of course, be used for application to the formed hollow pellets of additional of the material of which they are formed but in a finer state of subdivision. For example, after the pellets are removed from the bed a coating can be applied thereto, as by quick dipping or spraying, consisting of an aqueous slurry of the material, in finely divided form, of which the pellets are made. As a specific example, and referring to the herein previously disclosed formulation for making hollow mullite pellets, after the mullite pellets are formed and removed from the bed there can be applied thereto an aqueous slurry of the formulation disclosed. Of course the particle size of the ceramic in the slurry is much smaller than the size of the agglomerates formed from the slurry for use in the bed for making the pellets — a typical particle size for the ceramic in the slurry being about 5 microns and finer. After application of the slurry it is simply a matter of then drying the slurry coating. More than one coating of the slurry can be applied if desired. Further, to cause compaction of the shell, or at least the outer portions thereof, as is desired, the pellets, with the coating or coatings applied, can be subsequently rolled as aforesaid.

In the immediately aforedescribed technique for increasing the shell strength, the finer particle or grain size material was applied to the outer surfaces of the pellets thereby resulting in pellets having outer shell portions of greater density than that of the inner or initially formed portions of the shell. In some instances it may be desirable to reverse this, i.e., to have pellets wherein the inner shell portions are of greater density than that of the outer shell portions. This can be accomplished by initially forming the pellets from material — i.e., the material used for the bed — which is of fine grain size and then, after the pellets are removed from the bed, applying to their outer surfaces material of larger grain size.

The immediately aforesaid techniques for increasing the shell density of the pellets, and therefore the crush strength of the pellets is, of course, at the sacrifice of the porosity of the pellets. We now turn to an embodiment of the invention where the prime requirement for the pellets is not optimum crush strength but instead where the prime requirement, in the case of pellets of composite materials, and particularly catalytic pellets, is that there be minimal attrition of the second material, e.g., the catalyst, by reason of abrading contact of the exterior surfaces of the pellets with each other.

In accordance with this embodiment, the liquid drops which are dropped into or onto the powder bed are formulated to include the material, or an ingredient or combination of ingredients which result in the material, desired as the interior surface portions of the hollow pellets. Let us take as an example the situation of where it is desired to have the interior surface portions of the pellets formed of nickel oxide and the outer surface portions of the pellets formed of mullite. The method for accomplishing this is identical to the powder bed method described above, (i.e, any desired embodiment thereof described above), except that the liquid used for the drops is formulated to include either nickel oxide or a nickel salt, or other compound, such as nickel chloride, which, upon firing in an appropriate atmosphere, generally an oxidizing atmosphere, transforms to nickel oxide. Where nickel oxide is used as the ingredient in the liquid, the liquid from which the drops are formed consists of a suspension of finely divided nickel oxide powder in the other ingredients of the liquid, for example acetic acid and water. To illustrate, finely divided (for example, 325 Tyler mesh or finer) nickel oxide can be mixed into the aqueous acetic acid, in an amount, for example, of 100 grams nickel oxide per liter of the acid solution, to form a suspension thereof, and this liquid suspension can then be used as the drops dropped into or onto the powder bed the powder of which comprises the mullite ingredients. Alternatively, nickel chloride, in an amount, for example, of 100 grams per liter of solution, can be dissolved in the aqueous acetic acid solution and the resulting aqueous solution of acetic acid and nickel chloride is used as the liquid dropped, in the form of drops, into or onto the powder bed. In either case, the subsequent firing of the composite hollow pellets in an oxidizing atmosphere (though of course an oxidizing atmosphere is not necessary where nickel oxide is used in the liquid) results in hollow pellets wherein the outer surface is of sintered mullite and the inner surface is of nickel oxide. If platinum is desired as the inner surface material for the hollow pellets, then platinum chloride, for example, can be used as an ingredient in the liquid and the pellets can then be fired thereby resulting in pellets having an outer surface of sintered mullite and an inner surface of platinum. Of course, it will be understood that other materials can be used. For example, if it is desired to have pellets with an outer surface of aluminum oxide base ceramic, then an aluminum oxide base ceramic powder is used as the ceramic ingredient for the powder bed. Further, it will be understood that by adjusting the firing temperature and/or schedule, as is well known in the art, or by the technique previously herein described, the degree of porosity of the hollow pellets can be controlled. The key point here, irrespective of which of the various embodiments described previously herein is used for forming the hollow pellets, is that there is included in the liquid an ingredient or ingredients which result in the formation on the interior surface of the hollow pellets of the material desired for the interior surface.

The immediately aforesaid method has advantage, particularly for the forming of catalytic pellets. That is, by using as the material for the outer surface portions of the pellets a highly abrasion resistant material such as mullite or aluminum oxide base ceramic, and by using the desired catalyst as the material for the interior surface portions of the hollow pellets, there can be manufactured at low cost porous hollow pellets wherein the inner surface portions can function efficiently as the catalyst, by reason of the porosity while the outer surface portions function to protect the catalytic material against any abrasion thereby resulting in increased catalytic life. FIG. 5 shows a cross-section of such a composite hollow pellet in enlarged scale, the reference numeral 14 indicating the outer surface portion and the reference numeral 16 indicating the inner surface portion.

It will be understood, in light of the aforesaid, that while the invention has been described in detail particularly with reference to preferred embodiments thereof, various modifications may be made all within the full and intended scope of the claims which follow.

I claim:

1. A method for making a high strength hollow pellet comprising forming a hollow pellet the shell of which comprises particulate material by depositing the particulate material onto the surface of a drop of liquid subsequent to which the liquid is evaporated through the shell, and providing the shell with at least an outer portion having a density greater than that of the shell as initially formed by a step comprising either (a) compacting said shell by the application of compacting forces thereto, (b) applying to said shell a layer comprising particulate material of smaller size than that of the particulate material of which the shell is initially formed, or (c) a combination of (a) and (b).

2. A method as set forth in claim 1 wherein the particulate material is a sinterable material and wherein as a step subsequent to those set forth in claim 1 the pellet is fired to the sintering temperature of the particulate material.

3. A method for making a high strength hollow pellet comprising: surrounding at least most of the surface of a drop of a liquid with powder which includes the material of which it is desired to make the pellet and which is insoluble in the liquid thereby to form a shell of the powder around the drop, at least one of said liquid and powder including a binder for the material which binder is soluble in the liquid; the liquid being subsequently evaporated through the shell of powder thereby to provide a hollow pellet, and providing the shell with at least an outer portion which has a density greater than that of the shell as initially formed by a step comprising either (a) compacting said shell by the application of compacting forces thereto, (b) applying to said shell a layer comprising particulate material of smaller size than that of the particulate material of which the shell is initially formed, or (c) a combination of (a) and (b).

4. A method as set forth in claim 3 wherein the combination of said liquid and powder includes material for generating gas within the shell thereby to cause the shell to expand.

5. A method as set forth in claim 4 wherein one of said liquid and powder includes an acid and the other of said liquid and powder includes a material which reacts with the acid to cause the generation of carbon dioxide.

6. A method as set forth in claim 3 wherein said material is sinterable and wherein said pellets are fired to the sintering temperature of said material.

7. A method as set forth in claim 6 wherein said material is ceramic.

8. A method as set forth in claim 1 wherein the density is increased by a step comprising applying compacting forces to said shell and wherein said forces are applied prior to the evaporation of all the liquid therefrom.

9. A method as set forth in claim 1 wherein the density is increased by a step comprising applying to the initially formed shell a layer of particulate material having a size smaller than that of said powder.

10. A method as set forth in claim 9 wherein said layer is also subjected to compaction by the application of compacting forces thereto thereby to further increase the density.

11. A method for manufacturing a high strength hollow pellet comprising dropping into a powder suspended in gas a drop of a liquid to which the powder adheres thereby to form a shell of the powder around the drop, said powder including the material of which it is desired to make the pellet, which material is insoluble in said liquid, evaporating the liquid through the shell of the powder material thereby to provide a hollow pellet, and providing the shell with at least an outer portion having a density greater than that of the shell as initially formed by a step comprising either (a) compacting said shell by the application of compacting forces thereto, (b) applying to said shell a layer comprising particulate material of smaller size than that of the particulate material of which the shell is initially formed, or (c) a combination of (a) and (b).

12. A method for manufacturing a hollow pellet of sinterable material comprising dropping a drop of an aqueous solution into a fluidized powder bed whereby said powder adheres to the surface of said drop to form a shell of said powder therearound, the powder of said bed having been prepared by spray drying an aqueous slurry containing said sinterable material, a water soluble binder for said sinterable material and a material which reacts with the solute of said solution to generate gas which expands said shell, evaporating the water of said aqueous solution through the shell of the hollow pellet thereby formed, providing the shell with at least an outer portion having a density greater than that of the shell as initially formed, and thereafter heating said hollow pellet to the sintering temperature of said sinterable material.

13. A method for manufacturing a hollow pellet of sinterable material comprising dropping a drop of an aqueous solution onto a bed of powder, the upper surface of said drop being disposed above the surface of said bed, said powder having been prepared by spray drying an aqueous slurry of said sinterable material, a water soluble binder for said sinterable material and a material which reacts with the solute of said solution to generate gas; placing over said drop sufficient additional of said powder to cause at least most of the surface of said drop to be surrounded by said powder whereby said powder adheres to said drop to form a shell of said powder therearound and whereby said gas expands the shell, evaporating the water of said aqueous solution through said shell thereby to provide hollow pellets, providing the shell with at least an outer portion having a density greater than that of the shell as initially formed, and thereafter heating said hollow pellet to the sintering temperature of said sinterable material.

14. A method as set forth in claim 13 wherein said shell is provided with said increased density by compacting said shell prior to the evaporation of all the water therethrough.

15. A method as set forth in claim 13 wherein said shell is provided with said increased density by applying to said shell a layer of particulate material and binder therefor, the particulate material of said layer being of smaller size than that of the material of which the shell is initially formed.

* * * * *